Nov. 4, 1969           P. E. MENGERS                3,476,948
         OPTICAL INTRUSION DETECTION SYSTEM USING REFLECTED
                    DUAL BEAM PERIPHERAL SCANNING
Filed Feb. 19, 1968                                3 Sheets-Sheet 1

INVENTOR.
PAUL E. MENGERS

BY        AGENT

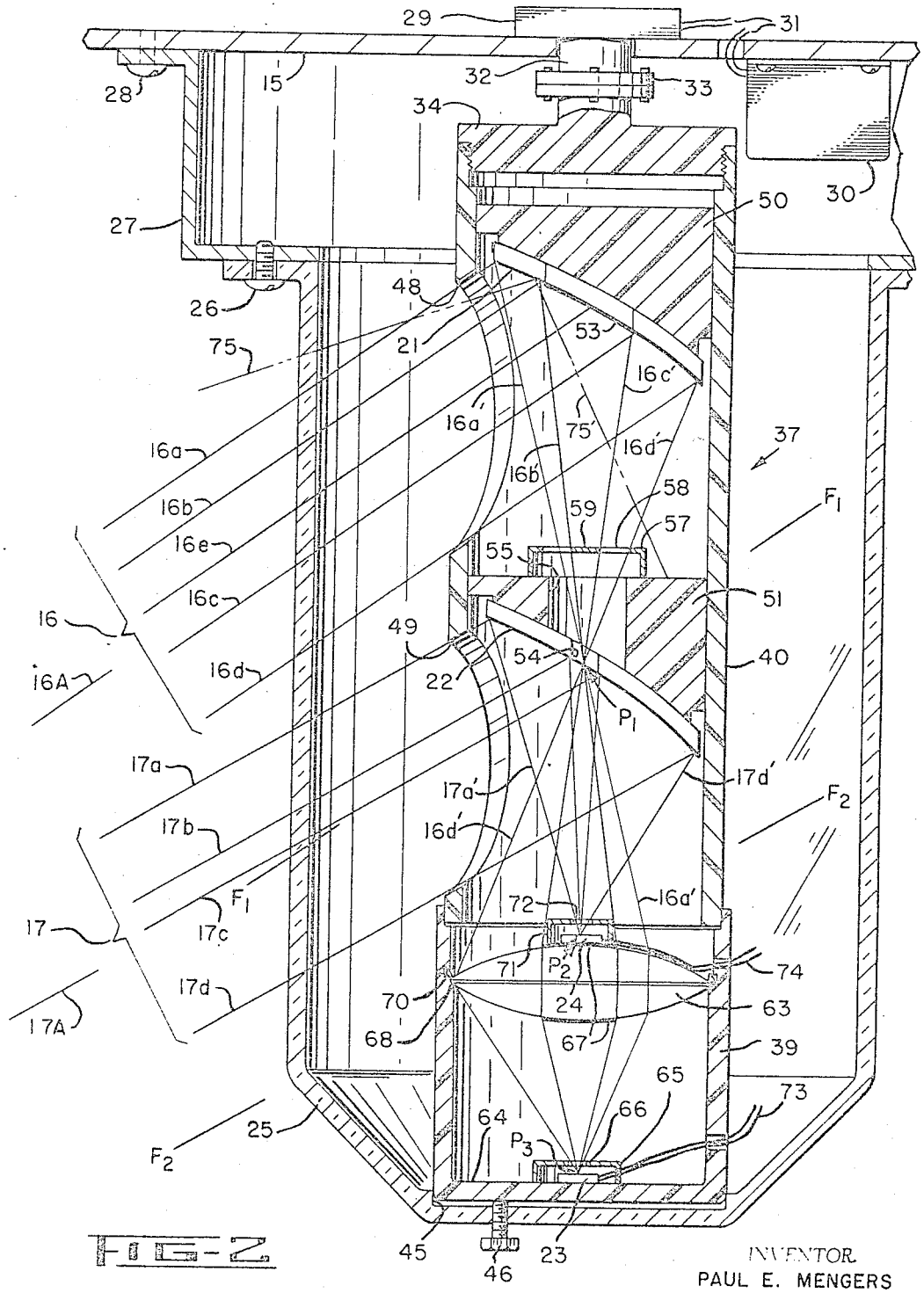

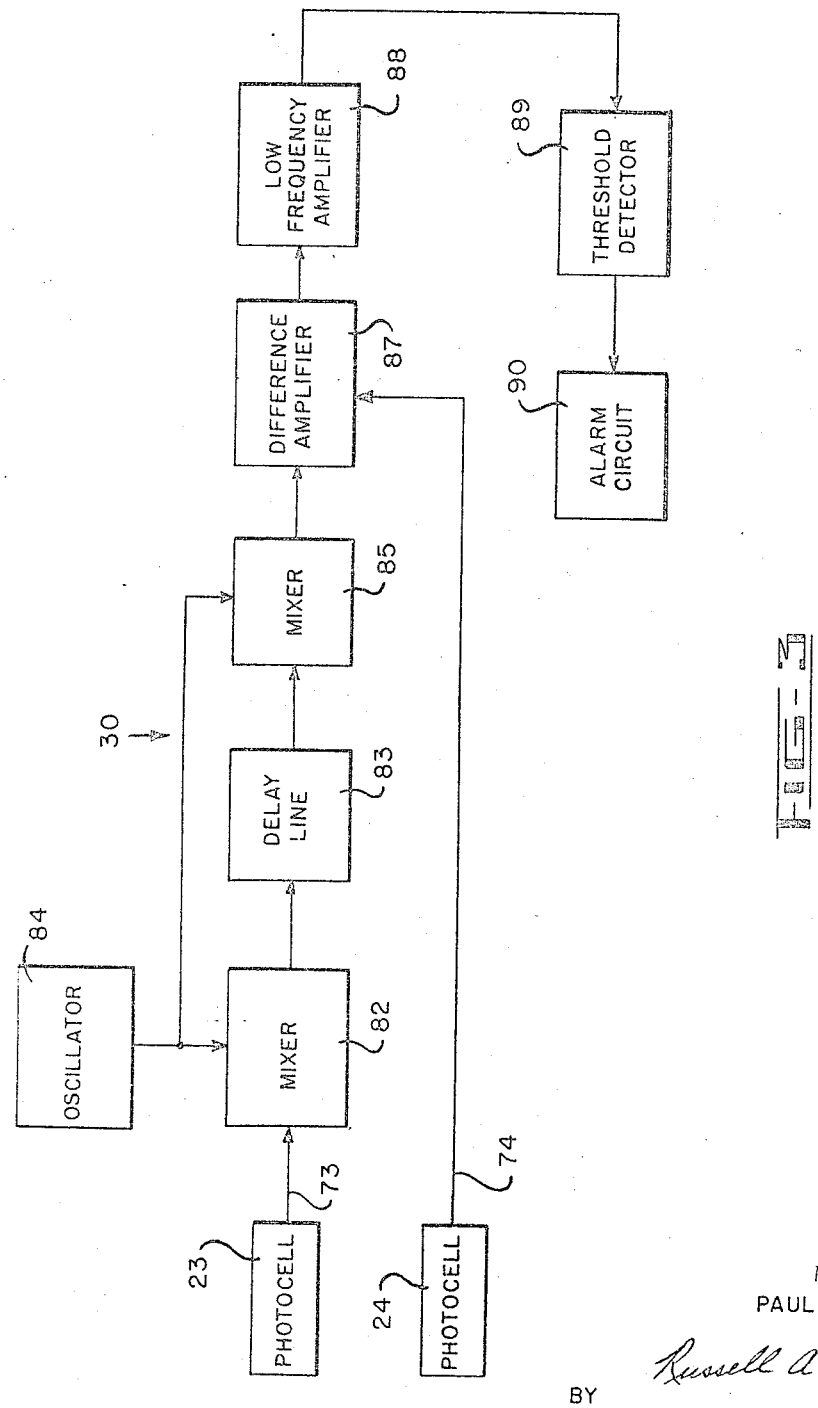

United States Patent Office 3,476,948
Patented Nov. 4, 1969

3,476,948
OPTICAL INTRUSION DETECTION SYSTEM USING REFLECTED DUAL BEAM PERIPHERAL SCANNING
Paul E. Mengers, Redwood City, Calif., assignor to Sylvania Electric Products Inc., a corporation of Delaware
Filed Feb. 19, 1968, Ser. No. 706,278
Int. Cl. H01j 39/12
U.S. Cl. 250—224
11 Claims

ABSTRACT OF THE DISCLOSURE

Light from two relatively fixed spots on a surface bounding the protected area of a room is focused by two remotely mounted rapidly rotating mirrors onto associated stationary photocells. The mirrors and photocells are mounted on the ceiling in vertically stacked relation. Axes between the mirrors and the spots form acute angles with the axis of rotation and with each other and each describes a cone of protection having an apex at the mirror and a base on the floor of the room. The rotating mirrors sequentially receive light from all spots on a circular band defining the perimeter of the protected area on the floor. The output of the photocell receiving light from the leading mirror is delayed appropriately and is compared with the output of the other photocell so that a difference in the outputs of the two photocells triggers an alarm. The delay is determined by the physical spacing of the two spots on the floor on which the mirrors are focused and the angular velocity of the mirrors.

Background of the invention

This invention relates to intrusion detection systems and more particularly to an optical system for determining intrusion into a room or the like.

Protection of a room by an optical system of the type described in Patent No. 3,191,048 generally depends upon the reaction of sensors to relative changes in light intensity in an entire room. While such a system is advantageous for complete volumetric protection, its capability to discriminate against normal light variations in a windowed room caused by sweeping automobile headlights, cloud masking of sunlight or moonlight, and the like is limited. Since such a system is susceptible to false alarms its use is limited to enclosures having controlled or predictable light environments such as windowless rooms.

An object of this invention is the provision of an optical intrusion detection system which has the detection capability of a modified volumetric system and the minimum false alarm capability of a narrow optical beam system.

The use of a scanning pencil beam in an optical detection system has been suggested in Patent No. 3,120,654 as a technique for protecting a large area. Such a system requires the installation of many reflectors opposite the transmitter-receiver station which not only limits its application and increases cost but complicates camouflage of the system. Furthermore, the spaces between reflectors are unprotected and to that extent the protected area is vulnerable to penetration.

Another object is the provision of an optical system which provides substantially complete floor to ceiling perimeter protection of a room.

Still another object is the provision of a scanning optical receiver in the form of a lighting fixture.

A further object is the provision of a highly focused optical sysem which utilizes two photocells and provides substantially complete floor to ceiling perimeter coverage or protection of a room.

Summary of the invention

An optical receiver has two photosensitive sensors focused to optically view two separate small-area spots, respectively, on a remote surface of the lighted room to be protected. The fields of view of these sensors are synchronized to move rapidly and simultaneously around the perimeter of the room and over the same path while a fixed spacing is maintained between the two viewed spots. The output from the leading spot sensor is delayed sufficiently to coincide with the output of the trailing spot sensor for light from the same spot and a continuous comparison of these delayed and undelayed outputs is made. If light intensity on one sensor changes relative to that on the other sensor, an alarm circuit is energized. The system thus achieves a high signal to noise ratio while providing essentially volumetric protection with apparatus having the appearance of a lighting fixture.

Description of the drawings

FIGURE 2 is a vertical section of the apparatus of FIGURE 1; and

FIGURE 3 is a block diagram of electrical circuits of the detection apparatus.

Description of preferred embodiment

Figure 1:
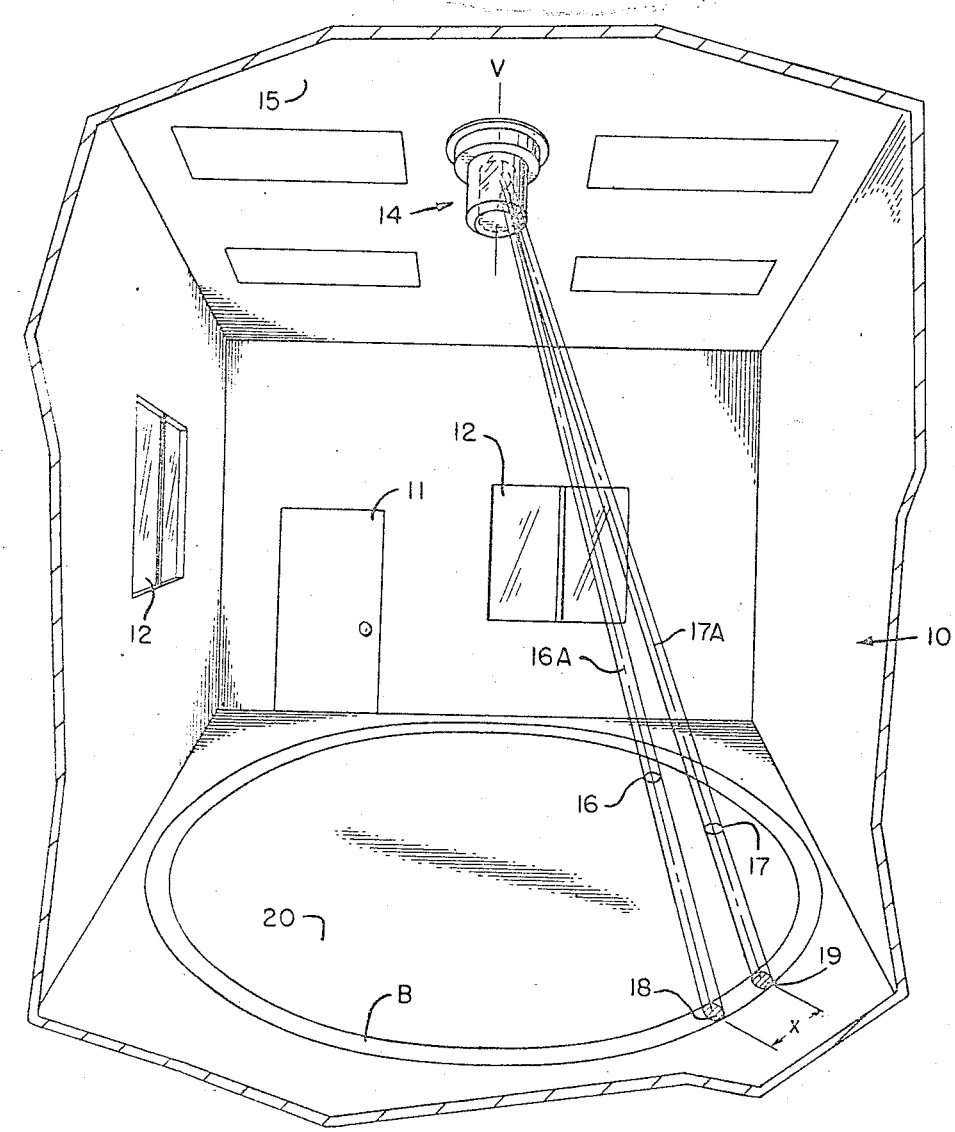
FIGURE 1 is a perspective view of a room partially broken away and showing intrusion detection apparatus embodying this invention.

Referring now to the drawings, FIGURE 1 shows a room 10 having a door 11 and windows 12 through which access to the room may be had. Intrusion detection apparatus 14 is mounted on the ceiling 15 in the manner of a light fixture and has optical beams 16 and 17 focused on sections 18 and 19, respectively, of floor 20. The optical beams 16 and 17 are fields of view formed by mirrors 21 and 22, respectively (see FIGURE 2) and constitute cylindrical shafts of light reflected from associated sections 18 and 19 of the floor. The center lines of beams 16 and 17 are designated by the broken lines 16A and 17A, respectively. The light beams are reflected by the mirrors to associated photocells 23 and 24 in apparatus 14 as will be more fully explained below. The breadth or maximum cross sectional dimensions of the optical beams are defined by the most remote points from which parallel rays of light incident on the mirrors 21 and 22 are reflected onto the associated photodetectors 23 and 24.

Detection apparatus 14 preferably is located in the center of the ceiling with mirrors 21 and 22 rotatably mounted so that beams 16 and 17 rotate about a vertical axis V and form an acute angle with that axis. The rotating beams therefore describe an imaginary cone as they rotate about axis V, the cone having its apex at the ceiling and its base forming a circular band B on the floor. This cone is the boundary of protection for the room, that is, changes in intensity of light in band B reflected from the floor in beams 16 and 17 cause the system to alarm. Changes in light intensity outside the beams have no discernible effect on the system which therefore discriminates against spurious light reflections within the room. If an intruder enters through door 11 or windows 12 and penetrates the imaginary cone, light intensity changes caused by this penetration are detected by the photodetectors which cause activation of an alarm, such as a bell or flashing light.

Apparatus 14 is shown in detail in FIGURE 2 and comprises a transparent cylindrically shaped housing 25 preferably removably secured by screws 26 to a base 27. The base is secured to the ceiling by screws 28 and contains motor 29 and signal processing circuit 30 which may be connected on lines 31 to an external source of power (not shown). Motor shaft 32 is connected by coupling 33 to a threaded adapter 34 which is removably connected to and supports an optical transducer assembly 37.

Assembly 37 comprises a stationary receptacle 39 supported on housing 25 at the lower end of cylindrical tube 40 so that the latter is rotatable relative to the receptacle. In particular, the lower end of tube 40 is located in the top of receptacle 39 for insuring axial alignment of these parts during rotation of tube 40. Tube 40 and receptacle 39 may be formed of Teflon or the like which has anti-friction properties ideally suited as bearing material. Receptacle 39 fits into a recess 45 on the inside of housing 25 and is secured thereto by screws 46 for preventing rotation of the receptacle.

Tube 40 has vertically aligned elliptical apertures 48 and 49 formed therein for passing cylindrical light beams 16 and 17 which are reflected from the floor. Focusing mirrors 21 and 22 are mounted on plugs 50 and 51 respectively, which are secured within tube 40 by suitable means such as screws not shown. The mirrors are off-axis paraboloids that are vertically spaced apart. An off-axis paraboloid is defined herein as a section of a paraboloid that is not centered about and may not include the vertex thereof. The vertexes of the paraboloids defining the reflecting surfaces of mirrors 21 and 22 are each located to the right of the associated mirror, as viewed in FIGURE 2. Mirror 21 has a non-reflecting or opaque center section 53. Mirror 22 has a central aperture 54 aligned with a transparent window or aperture 55 in supporting plug 51. An opaque cap 57 is coaxially mounted on plug 51 and has a transparent annular washer-like section 58 in the top wall thereof.

Receptacle 39 comprises photodetectors 23 and 24 and lens 63. Photodetector 23 is coaxially mounted on the inner surface of the end 64 of the receptacle. An opaque cap 65 having a central aperture 66 is also mounted on end 64 coaxial with detector 23. Lens 63 is a spherical lens having an opaque central section 67. The lens is spaced approximately one focal length from detector 23, rests on shoulder 68 of the receptacle and is locked in the receptacle by snap ring 70. Photodetector 24 is coaxial with and is bonded to lens 63. An opaque cap 71 having a central aperture 72 is also bonded to the lens. The outputs of the detectors 23 and 24 are coupled by lines 73 and 74 to the signal processing circuit 30.

Mirror 21 is oriented with the focal point $P_1$ of the paraboloidal reflecting surface thereof on the axis V and the focal axis $F_1$—$F_1$ of this surface (extending through the focal point $P_1$) parallel to the center line 16A of beam 16. Light rays $16a$–$16d$ of beam 16 that are parallel to focal axis $F_1$—$F_1$ are therefore reflected by mirror 21 to focus at focal point $P_1$. Mirror 22 is positioned in tube 40 so that the focal point $P_1$ associated with mirror 21 is located in aperture 54. Thus, light rays $16a'$–$16d'$ reflected by mirror 21 are not obstructed by mirror 22. These rays are passed through aperture 54 and focused by lens 63 onto the photosensitive surface of detector 23 which is located proximate the focal point of the lens.

Mirror 22 is also oriented with the associated focal point $P_2$ on the axis V and with the focal axis $F_2$—$F_2$ parallel to the center line 17A of beam 17. Light rays $17a$–$17d$ of beam 17 that are parallel to focal axis $F_2$—$F_2$ are therefore reflected by mirror 22 to focus at the focal point $P_2$. Lens 63 is positioned in the receptacle 39 so that the photosensitive surface of detector 62 is located proximate the focal point $P_2$ associated with mirror 22. Thus, light rays $17a'$–$17d'$ are incident on and detected by photocell 24.

The focal axis $F_1$—$F_1$ associated with mirror 21 forms an acute angle with the focal axis $F_2$—$F_2$ associated with mirror 22 (i.e., the focal axes are not parallel) so that the mirrors view associated spots 18 and 19 on the floor which transcribe the same circular band B when the mirrors are rotated.

It is desirable that detector 24 be responsive only to changes in the intensity of light in beam 17 (i.e., be unresponsive to light rays in incident beam 16). In order to accomplish this, the central portion 53 of mirror 21 is opaque to absorb and therefore prevent reflection of light rays from mirror 21 that would normally be reflected onto detector 24. By way of example, a light ray $16e$ which would normally be reflected along the axis of tube 40 to detector 62 is absorbed by the opaque portion 53. Similarly, opaque portion 59 of cap 57 would block such a reflected light ray. It is in this manner that opaque portion 53 and the opaque portions of cap 57 block light reflected by mirror 21 from detector 24. In a similar manner, the opaque portions of caps 65 and 71 limit the light incident on the associated photocells 23 and 24. The dimensions of the opaque portions 53 and 59 are determined by the spacing between, the orientation of and focal lengths of the paraboloids.

This invention utilizes the inherent properties of a paraboloidal reflector to insure that the detectors are responsive to light rays parallel to the focal axis of the associated paraboloidal reflecting surface and in the field of view of the associated mirror, but at the same time are unresponsive to light rays incident on the mirrors at an angle with respect to the focal axis (i.e., not parallel to the focal axis). Light rays incident on a paraboloidal reflector and parallel to its focal axis are all reflected through the focal point of the paraboloid. If the incident light rays are parallel to each other but are not parallel to the focal axis, however, the rays are focused to a point that is spaced from the focal point of the paraboloid. Thus, a light ray such as ray 75 which is incident on mirror 21 but is not parallel to the focal axis $F_1$—$F_1$ is reflected to a point other than the focal point $P_1$ and blocked from detector 23. The inner surfaces of tube 40, plug 51, and caps 57, 65 and 71 are preferably opaque to prevent reflection of light rays incident thereon.

Tube 40 and therefore optical tubes 16 and 17 are rotated about axis V by drive motor 29. Light in the tubes 16 and 17 from the limited area on floor 20 in band B and within the field of view of the mirrors is reflected onto the photosensitive surface of the associated photocells. The outputs of detectors 23 and 24 on leads 73 and 74, respectively, are therefore directly proportional to the intensity of light reflected from the associated spots on the floor.

The signal processing circuit 30 comprises a mixer 82, see FIGURE 3, connected to the output of photocell 23 receiving light from the leading or front rotating optical tube 16. The output of mixer 82 is delayed by delay line 83 and is combined with the output of oscillator 84 in a second mixer 85. The output of the oscillator 84 is also connected to mixer 82. The output of the other or "trailing" photocell is fed directly by line 74 to a difference amplifier 87 t owhich the output of mixer 85 is connected. Amplifier 87 compares the delayed output of photocell 23 with the undelayed output of photocell 24 and produces a doppler-type output signal if an intruder enters the protected room and changes the light reflected from the same spot on band B to the photocells. In the absence of such a change in light, the output of difference amplifier 87 is effectively zero. A low frequency amplifier 88 passes the low frequency output of the difference amplifier to a threshold detector 89. If the magnitude of the output of amplifier 88 is greater than the predetermined threshold level of detector 89, alarm circuit 90 is actuated to indicate an intrusion.

The period or time delay line 83 is related to the angular velocity of tubes 16 and 17 and the spacing of the spots 18 and 19 they view on the floor such that the outputs of the photocells when receiving light from the same spot are compared in difference amplifier 37. In other words, the period required for the cells to rotate such that the viewed spots on the floor have traversed the separation distance $x$ between the spots is substantially the period of the delay line 83. The outputs of the two sensors are thus conditioned for detecting any change in light reflected from the same limited floor area from the time that area is viewed by the lead cell until the trailing cell views it. By way of example, in a system scanning a circular band B having a mean radius of 100 feet at an angular velocity of 1800 revolutions per minute and an arcuate spacing between viewed spots 18 and 19 of 1 foot would utilize a delay line having a period of 500 microseconds.

In operation, motor 29 is energized by connection to a power source by a remote switch (not shown) and the motor continuously rotates tube 40 so that the mirrors and associated optical tubes 16 and 17 scan the band B on the floor of the protected room. A conventional lamp or fixture may be used to illuminate the room so that the intensity of light reflected from any spot on band B to the photocell is relatively constant. If an intruder enters the room through door 11 or windows 12 and moves across the band B, mirrors 21 and 22 will reflect different amounts of light onto photocells 23 and 24. The difference between the detected signals is amplified by the difference amplifier and applied to the threshold detector and alarm circuit to produce an indication of an intrusion of the protected area. In order to increase spurious signal discrimination capability, the sensitivity of the system may be adjusted to a low level by increasing the threshold level of detector 89 so that an alarm is given only by penetration of the protective cone by an intruder. The alarm circuit may be located remotely at a central guard station or may consist of a connection to telephone lines, remote display devices or other monitoring apparatus as may be required or desired.

Changes, modifications and improvements to the above described embodiment of the invention may be made by those skilled in the art without departing from the spirit and scope of the invention. The appended claims describe the novel features of the invention.

I claim:

1. Apparatus for detecting changes in the intensity of light from a boundary of a protected area comprising:
   first and second sensors,
   reflecting means forming at any one instant first and second optical beams comprising parallel light rays from different spots which are spaced apart on the boundary and reflecting light rays in said first and second beams to said first and second sensors, respectively,
   means for moving said beams over the boundary at the same rate and maintaining constant the orientation of said beams with respect to each other during movement whereby each sensor in succession receives light from the same spot on the boundary, and
   a signal processor responsive to the outputs of said sensors, said processor comprising:
         means for detecting a change in the output of one of said sensors relative to the other for light received from the same spot on the boundary, and
   means responsive to said detected changes for indicating this condition.

2. Apparatus according to claim 1 in which said detecting means comprises:
   means for delaying the output of the first sensor in response to light from a given spot for a period equal to the time from response of the first sensor to response of the second sensor to light from the same spot, and
   means for comparing the delayed and undelayed outputs of said sensors.

3. Apparatus according to claim 2 including:
   a threshold detector responsive to the output of said comparing means and producing an output when the difference between the delayed and undelayed sensor outputs exceeds a predetermined level, and
   an alarm circuit responsive to the output of said detector for giving an alarm.

4. Apparatus according to claim 1 in which said reflecting means comprises first and second mirrors reflecting light rays in said first and second beams from different spots to said first and second sensors, respectively.

5. Apparatus according to claim 4 wherein said sensors each comprise a photocell having a photosensitive surface, and said mirrors each have a paraboloidal reflecting surface causing light rays in the associated optical beam to focus proximate the photosensitive surface of the associated photocell.

6. Apparatus according to claim 5 wherein the reflecting surfaces of said mirrors are off-axis paraboloids, each mirror being oriented such that parallel light rays in the associated optical beam incident on the mirror are reflected onto the photosensitive surface of the associated photocell.

7. Apparatus according to claim 6 in which the focal axis of the paraboloidal reflecting surface of each mirror is parallel to the center line of the associated optical beam for causing only incident light rays parallel to the center line to focus proximate the photosensitive surface of the associated photocell.

8. Intrusion detection apparatus including a rotating electro-optical transducer assembly receiving light at any one instant from different spots spaced apart on a band defining a perimeter of a protected area, said assembly in succession receiving light from the same spot and producing first and second electrical outputs proportional to the intensity of light from associated spots, and a signal processor determining changes in one of the outputs relative to the other output for light received from the same spot for indicating intrusion of the protected area, said transducer assembly comprising:
   first and second photocells having photosensitive surfaces, and
   first and second mirrors reflecting light from different spots to the photosensitive surfaces of said first and second photocells, respectively.

9. Apparatus according to claim 8 wherein each of said mirrors has a paraboloidal reflecting surface oriented for causing incident parallel light rays from an associated spot on the perimeter to focus proximate the photosensitive surface of the associated photocell.

10. Apparatus according to claim 8,
    said transducer assembly having an axis of rotation extending through the reflecting surfaces of said mirrors which are spaced apart along said axis,
    each of said mirrors having a reflecting surface that is an off-set paraboloid having a focal point on the axis of rotation and having a focal axis parallel to light rays received from an associated spot,
    said second mirror being located at the focal point of said first mirror and having an aperture therethrough centered with said axis of rotation,
    a spherical lens coaxial with said aperture and located proximate the focal point of said second mirror,
    said second photocell being coaxial with said lens proximate the focal point of said second mirror.
    said first mirror having a non-reflecting central section whereby said second photocell receives only light rays incident on said second mirror and parallel to the focal axis thereof,
    said first photocell being spaced one focal length from said lens for receiving only light rays parallel to the focal axis of said first mirror that are reflected thereby to said lens and focused onto the photosensitive surface of said first photocell.

11. Apparatus for detecting intrusion into a protected area in a lighted room comprising:
- a motor securely mounted on the ceiling of the room,
- a tubular housing having one end coupled to said motor for rotating said housing about its longitudinal axis, said housing having first and second apertures vertically spaced apart in the wall thereof,
- first and second mirrors rigidly mounted in said housing, said mirrors each having reflecting surfaces are off-axis paraboloids forming first and second optical beams, respectively, passing light through said housing apertures from different spots which are spaced apart on the floor of the room.
- rotation of said housing and said mirrors causing the beams to transcribe an imaginary cone in the room and a band on the floor which define the perimeter of the protected area, each mirror successively receiving light from the same spot on the band on the floor,
- said paraboloids each having a focal point located on the axis of rotation and a focal axis parallel to the center line of the associated optical beam,
- said second mirror having a central aperture therethrough located proximate the focal point of said first mirror,
- a fixture-like optically transparent cover enclosing said housing and secured to the ceiling whereby to stimulate a lighting fixture,
- a receptacle axially aligned with said housing and having one end rigidly secured to said cover for preventing rotation of said receptacle, the other end of said receptacle mating with the other end of said housing for supporting rotation of the latter,
- a spherical lens vertically spaced from the one end of said receptacle and rigidly secured in said receptacle proximate the focal point of said second mirror,
- a first photocell secured to the one end of said receptacle coaxial with said housing, the photosensitive surface of said first photocell facing the reflecting surfaces of said mirrors and being located proximate the focal point of said lens remote from said mirrors.
- a second photocell coaxial with said lens and secured to the surface thereof proximate the focal point of said second mirror,
- said first mirror having a non-reflecting central section whereby only light rays in the second beam that are parallel to the second focal axis are reflected onto the photosensitive surface of said second photocell,
- said lens focusing light rays in said first beam parallel to the first focal axis and reflected by said mirror to be incident on the photosensitive surface of said first photocell,
- said photocells producing electrical outputs proportional to the intensity of light received from associated spots on the floor, and
- a signal processor rigidly secured to the ceiling and electrically connected to the outputs of said stationary photocells and comprising:
    - a delay circuit for delaying the output of the lead rotating photocell to light from a given spot a period equal to the time from the response of the leading photocell until the response of the lagging photocell to light from the same spot,
    - a difference circuit for comparing the delayed and undelayed outputs of the photocells,
    - a threshold circuit producing an output when the difference signal from the difference circuit exceeds a prescribed threshold, and
    - an alarm circuit responsive to the output of the threshold circuit for producing an indication of intrusion of the protected area.

References Cited
UNITED STATES PATENTS

| | | | |
|---|---|---|---|
| 2,493,543 | 1/1950 | Merchant | 340—276 X |
| 3,120,654 | 2/1964 | Lee. | |
| 3,191,048 | 6/1965 | Cowen | 340—285 X |

RALPH G. NILSON, Primary Examiner

C. M. LEEDOM, Assistant Examiner

U.S. Cl. X.R.

340—276, 228